(12) United States Patent  (10) Patent No.: US 6,442,353 B2
Hase  (45) Date of Patent: Aug. 27, 2002

(54) CAMERA

(75) Inventor: Hiroyuki Hase, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 09/783,670

(22) Filed: Feb. 14, 2001

(30) Foreign Application Priority Data

Feb. 18, 2000 (JP) ....................................... 2000-040411

(51) Int. Cl.$^7$ ............................................. G03B 17/02
(52) U.S. Cl. ..................................... 396/536; 396/538
(58) Field of Search ................................ 396/144, 146, 396/535, 536, 538

(56) References Cited

U.S. PATENT DOCUMENTS 5,432,575 A  * 7/1995 Funahashi .................... 396/405
6,101,341 A  * 8/2000 Manabe ....................... 396/536

* cited by examiner

Primary Examiner—David M. Gray
(74) Attorney, Agent, or Firm—Robin, Blecker & Daley

(57) ABSTRACT

A camera has a cartridge chamber lid lock device arranged to allow the camera to be loaded with a film cartridge by opening a cartridge chamber lid irrespective of the position of a lens barrel in the optical axis direction when the film cartridge is not within the cartridge chamber and, when the film cartridge is loaded in the cartridge chamber, to prevent the cartridge chamber lid from being accidentally opened in a case where the film still remains outside the film cartridge or from being inadvertently opened while a using state of the film cartridge is in process of being set.

8 Claims, 14 Drawing Sheets

CAMERA

BACKGROUND OF THE INVENTION

1. Field of the Invention

The present invention relates to a camera, and more particularly to an improvement on a cartridge chamber lid lock device for setting the lid of a cartridge chamber of the camera to an unlocked state or to a locked state.

2. Description of Related Art

Cartridge chamber lid lock devices have been disclosed, for example, in Japanese Laid-Open Patent Application No. Hei 6-258699, Japanese Laid-Open Patent Application No. Hei 9-211596, etc.

The cartridge chamber lid lock device disclosed in Japanese Laid-Open Patent Application No. Hei 6-258699 is arranged to set a lock member at a locking position or at an unlocking position according to the movement of a constituent part of a photo-taking lens barrel. The cartridge chamber lid lock device disclosed in Japanese Laid-Open Patent Application No. Hei 9-211596 is arranged to set a lock member either at a locking position or at an unlocking position in association with the movement of a film sent out from a film cartridge.

However, in the case of the cartridge chamber lid lock device disclosed in Japanese Laid-Open Patent Application No. Hei 6-258699, since the cartridge chamber lid is locked or unlocked while the position of the photo-taking lens is at a part of a drawn-in region, the cartridge chamber lid is left in a locked state when the photo-taking lens barrel is at a drawn-out position with no film cartridge loaded. Under this condition, the camera cannot be loaded with a film cartridge. In loading the camera with a film cartridge, therefore, the photo-taking lens barrel must be once drawn into the drawn-in region. The cartridge chamber lid lock device thus makes a film cartridge loading operation troublesome.

Further, in the case of the cartridge chamber lid lock device disclosed in Japanese Laid-Open Patent Application No. Hei 9-211596, the cartridge chamber lid can be locked until a film sent out from a film cartridge is completely rewound. This arrangement allows the cartridge chamber lid to be opened even before the completion of setting a film-using-state indicator after the completion of rewinding the film. If the cartridge chamber lid is opened and the film cartridge is taken out from the cartridge chamber before the completion of setting the film-using-state indicator after the completion of rewinding the film, the film-using-state indicator cannot be set at a correct position, so that it becomes impossible to find out the using state of the film cartridge.

BRIEF SUMMARY OF THE INVENTION

In accordance with an aspect of the invention, there is provided a cartridge chamber lid lock device of a camera capable of, when no film cartridge is loaded in a cartridge chamber, allowing a cartridge chamber lid to be opened for loading a film cartridge into the cartridge camber irrespective of a position where a lens barrel is located in an optical direction, and capable of surely preventing the cartridge chamber lid from being accidentally opened when a film is in a state of being sent out from a film cartridge loaded into the cartridge chamber, and surely preventing the cartridge chamber lid from being inadvertently opened during process of setting a using state of the film cartridge.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
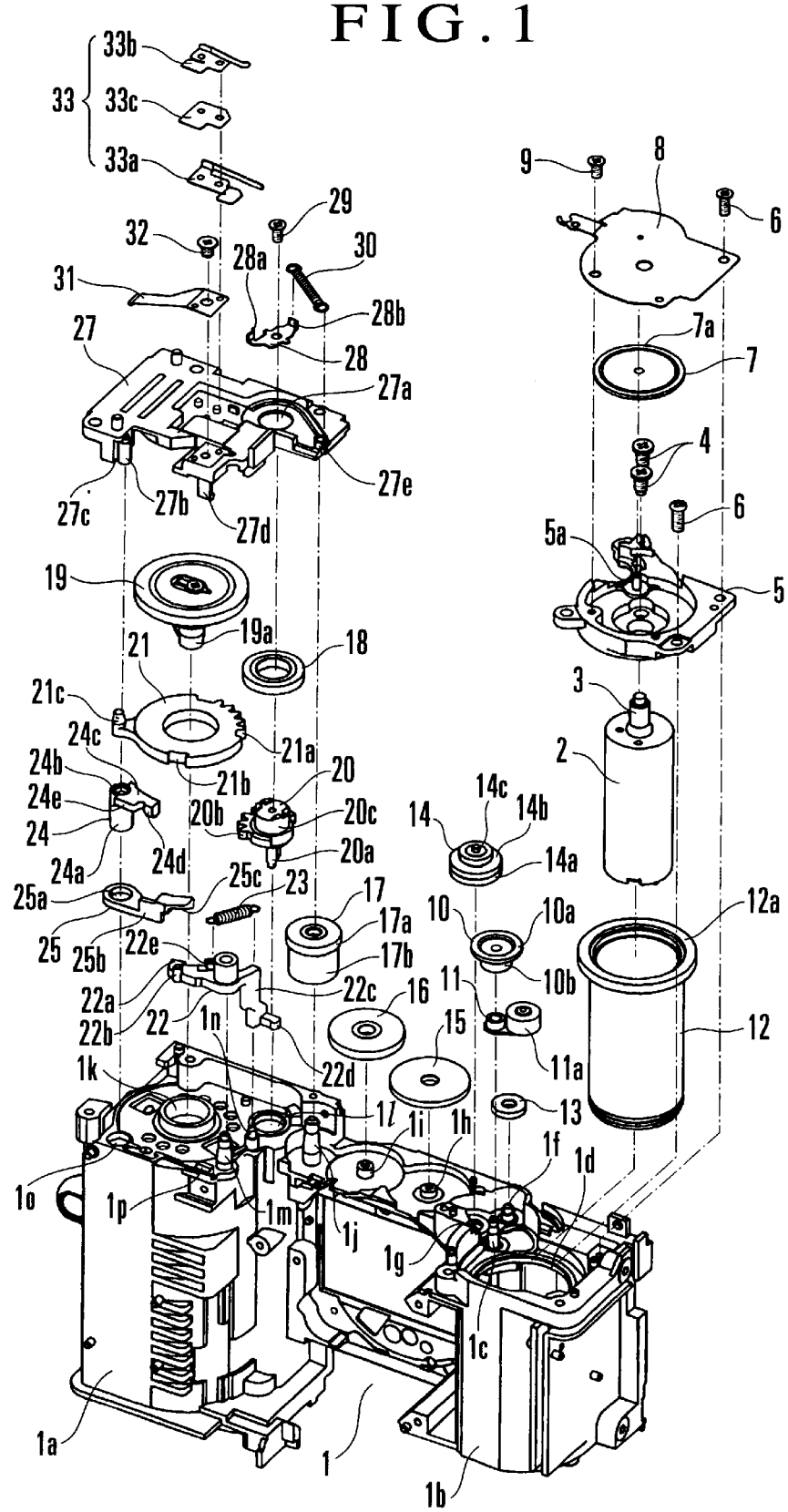
FIG. 1 is an exploded perspective view showing the arrangement of a film transport device, a lightblocking door opening-closing device, a cartridge chamber lid lock device and a cartridge ejecting device which are contained in a camera according to an embodiment of the invention.
Figure 2:
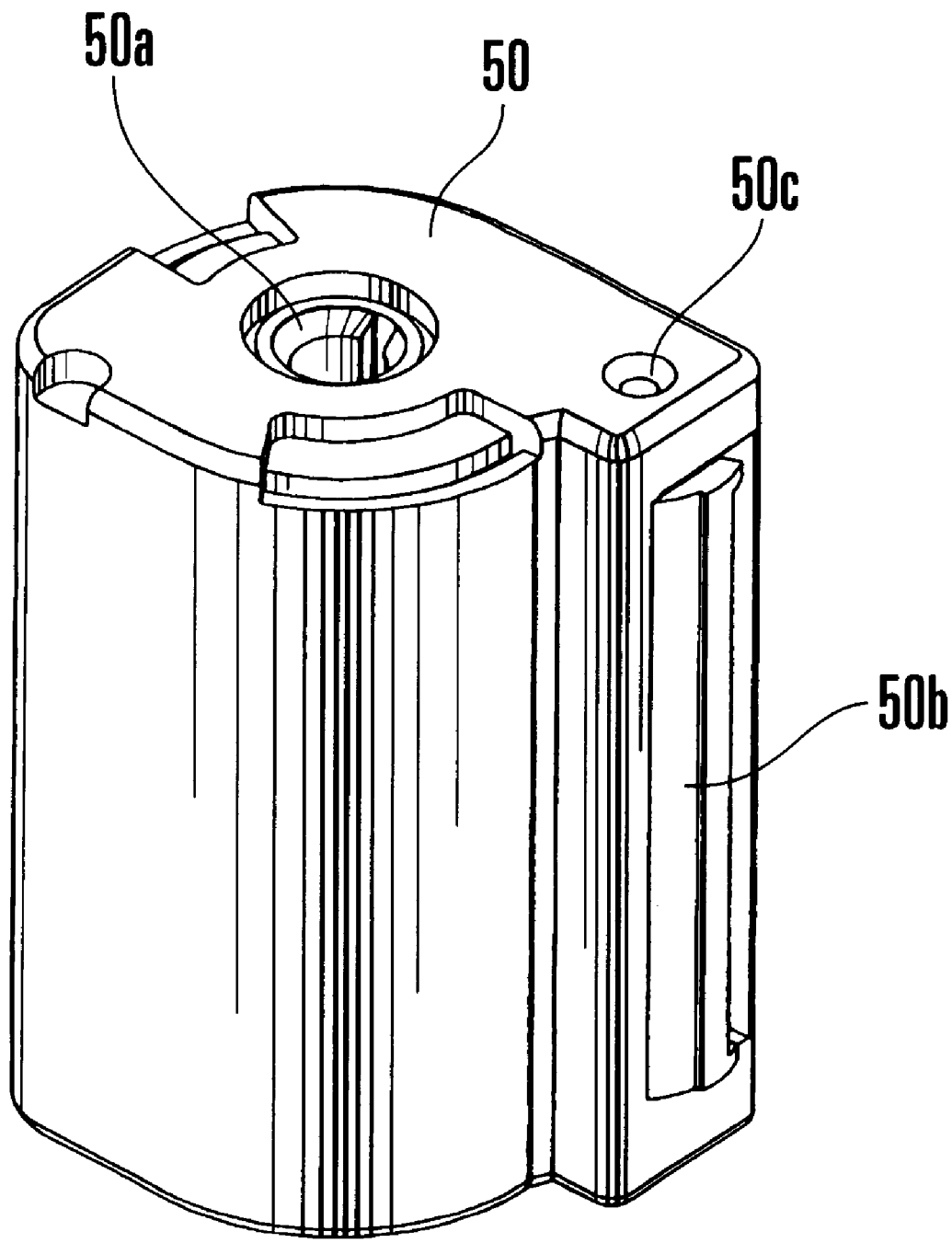
FIG. 2 is a perspective view showing a film cartridge to be used for the camera according to the embodiment of the invention.
Figure 3:
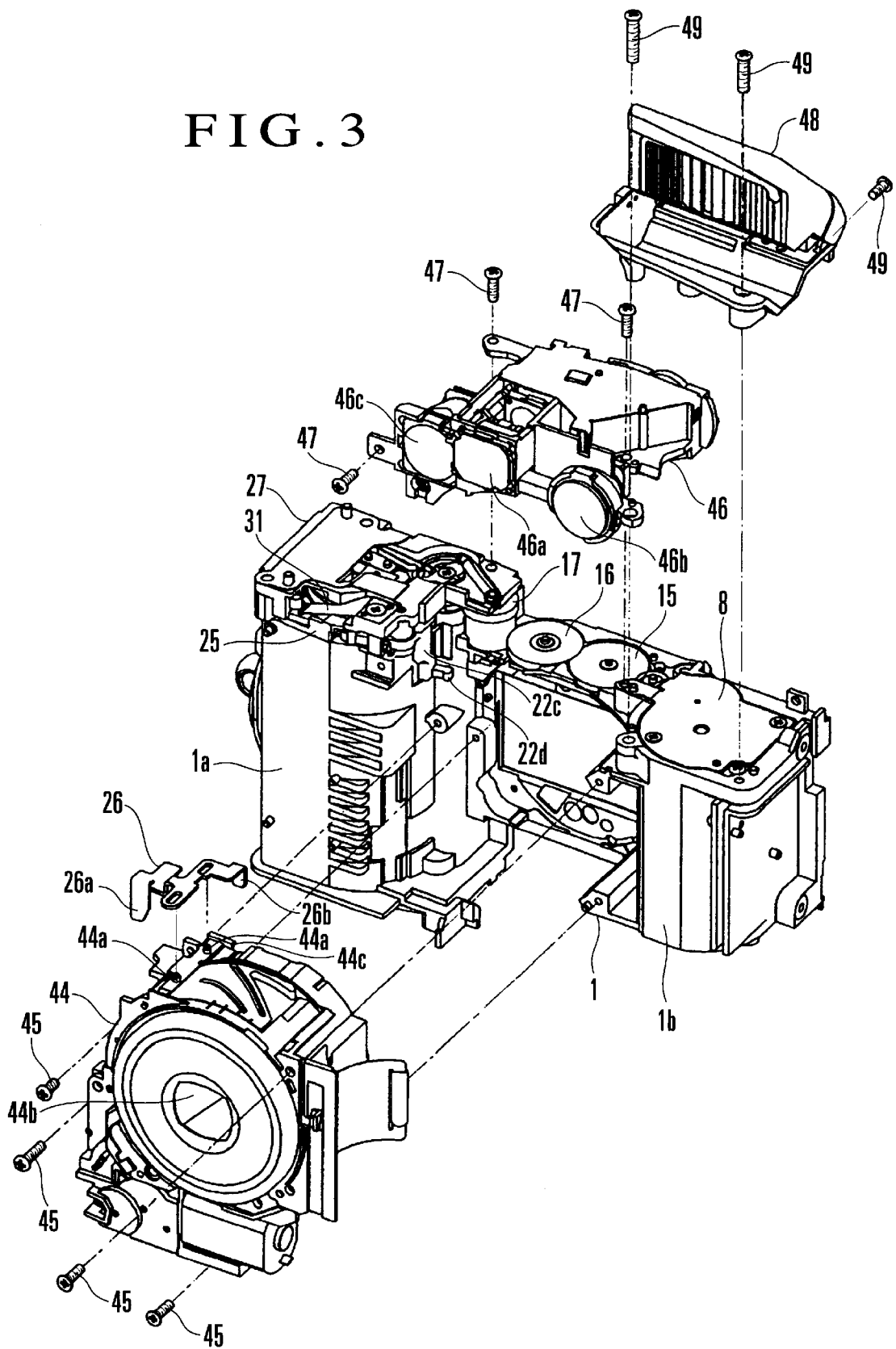
FIG. 3 is an exploded perspective view showing the arrangement of principal units of the camera according to the embodiment of the invention.
Figure 4:
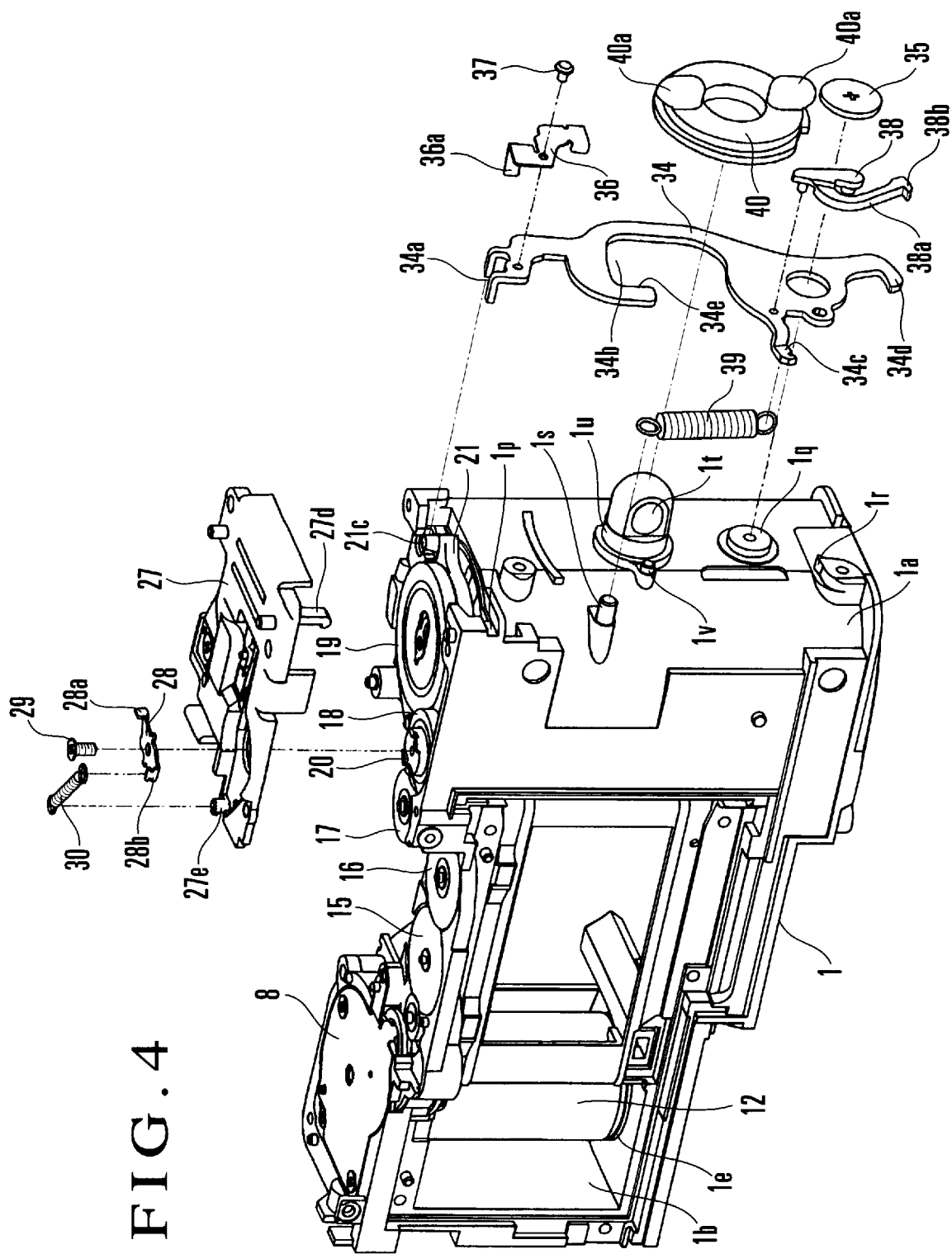
FIG. 4 is an exploded perspective view showing the arrangement of a cartridge chamber lid opening-closing device contained in the camera according to the embodiment of the invention.
Figure 5:
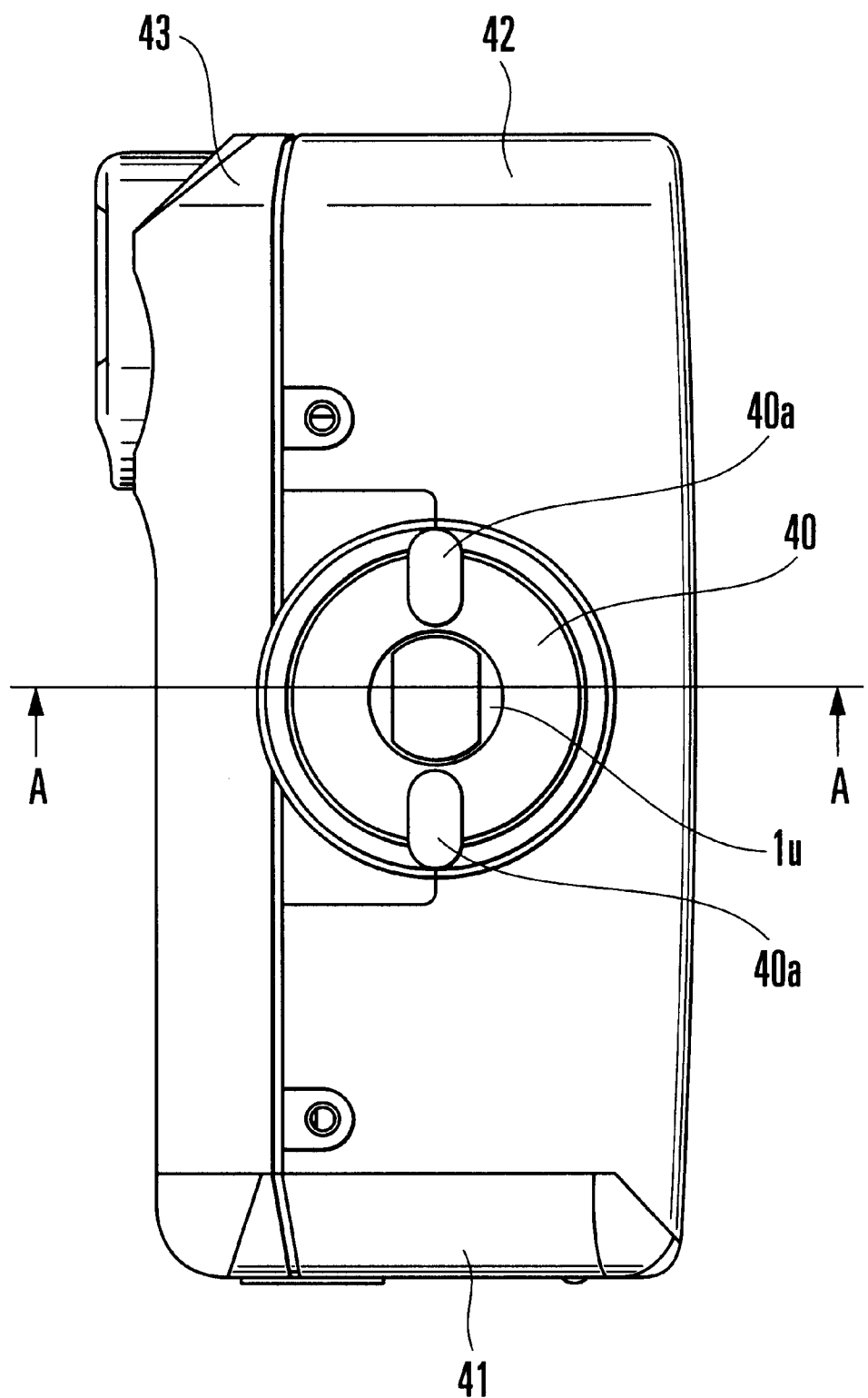
FIG. 5 is a side view showing a holding state of an operation knob provided on the camera according to the embodiment of the invention.
Figure 6:
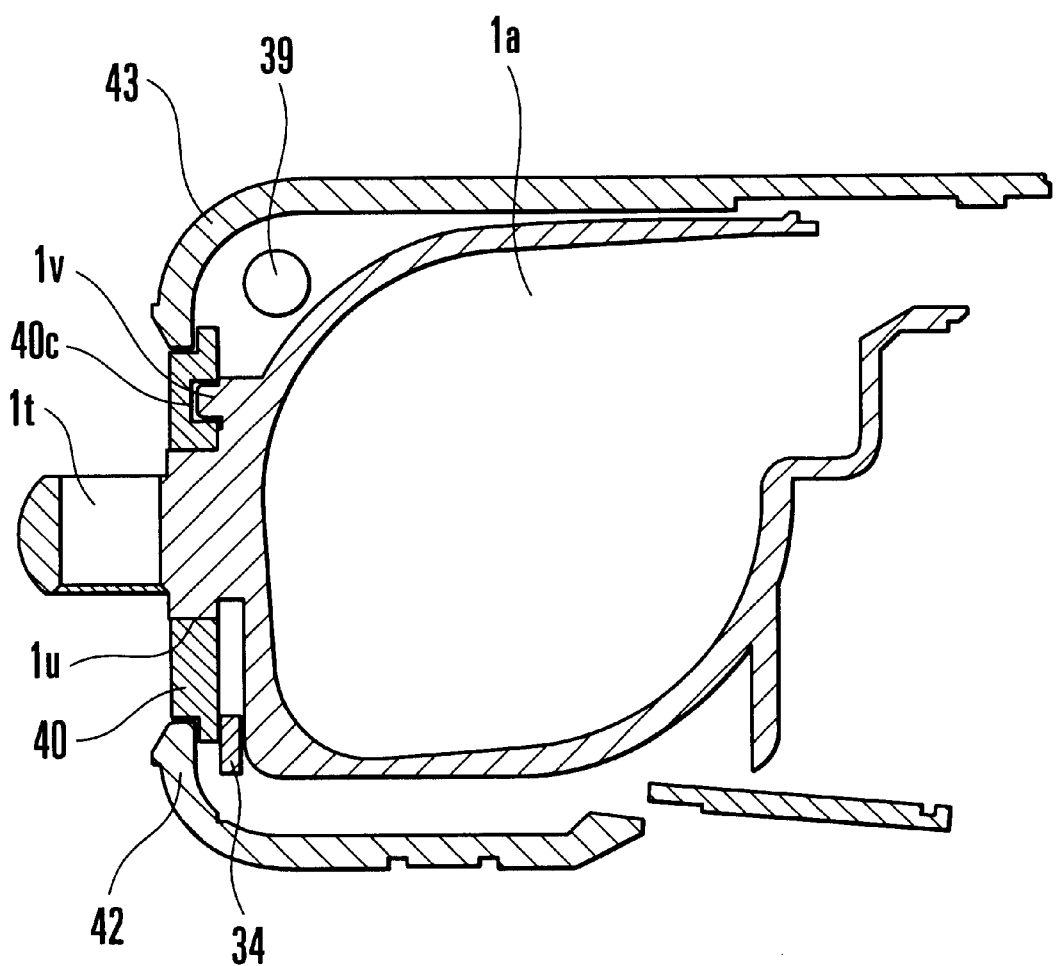
FIG. 6 is a sectional view taken on a line A—A in FIG. 5, showing the holding state of the operation knob provided on the camera according to the embodiment of the invention.

FIGS. 1 to 15 relate to the embodiment of the invention. FIG. 1 is an exploded perspective view showing the respective constituent parts of a film transport device, a light-blocking door opening-closing device, a cartridge chamber lid lock device and a cartridge ejecting device arranged for a camera according to the embodiment of the invention. FIG. 2 is a perspective view showing a film cartridge to be used for the camera. FIG. 3 is an exploded perspective view showing the arrangement of principal units of the camera. FIG. 4 is an exploded perspective view mainly showing constituent parts of a cartridge chamber lid opening-closing device. FIG. 5 is a side view showing a holding state of an operation knob provided on the camera. FIG. 6 is a sectional view taken on a line A—A in FIG. 5.

Figure 7:
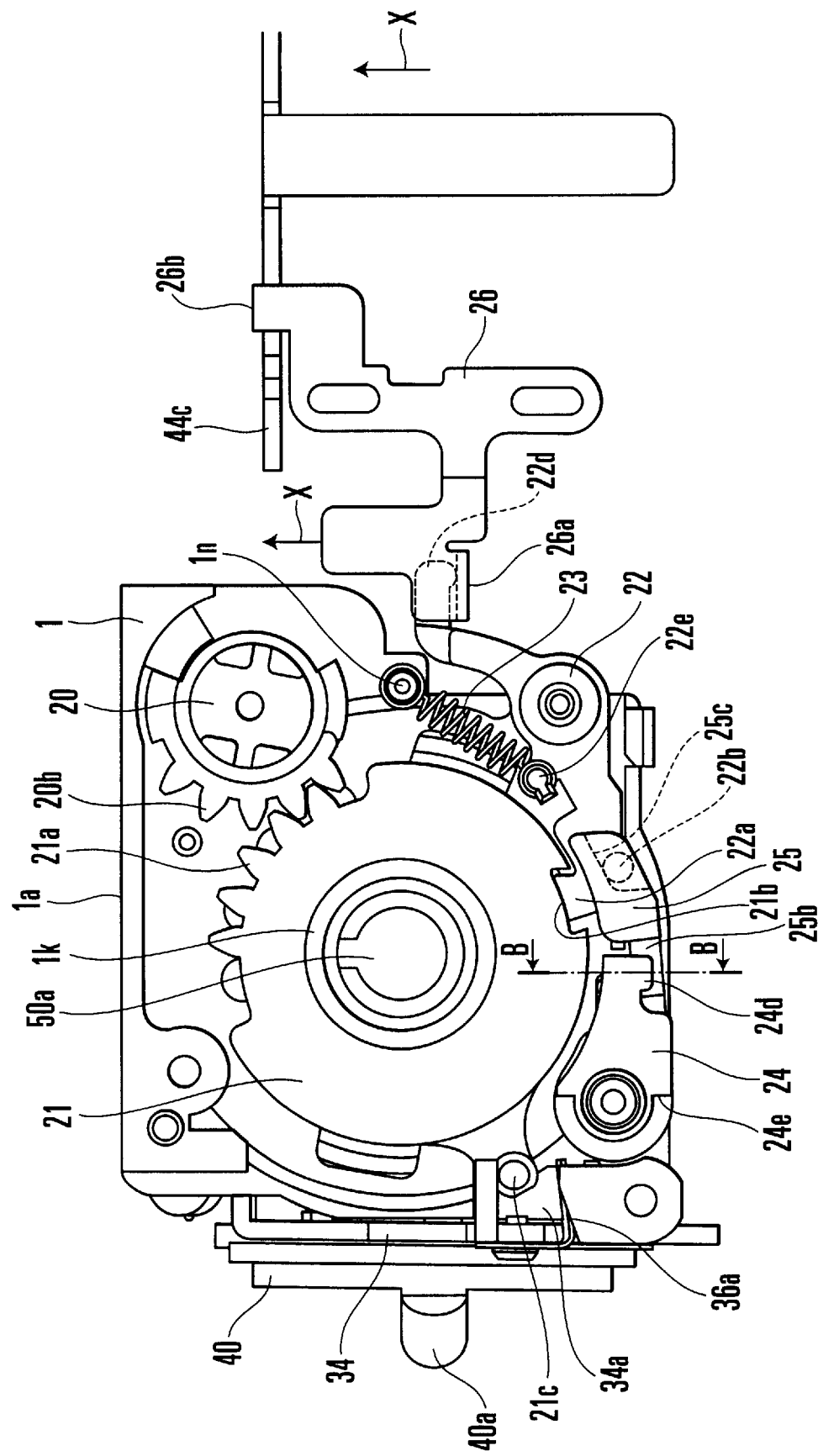
FIG. 7 is a top view showing the state in which, in the camera according to the embodiment of the invention, with a film cartridge loaded and a lens barrel unit moved to a first non-photo-taking position, a driving ring is locked.
Figure 8:
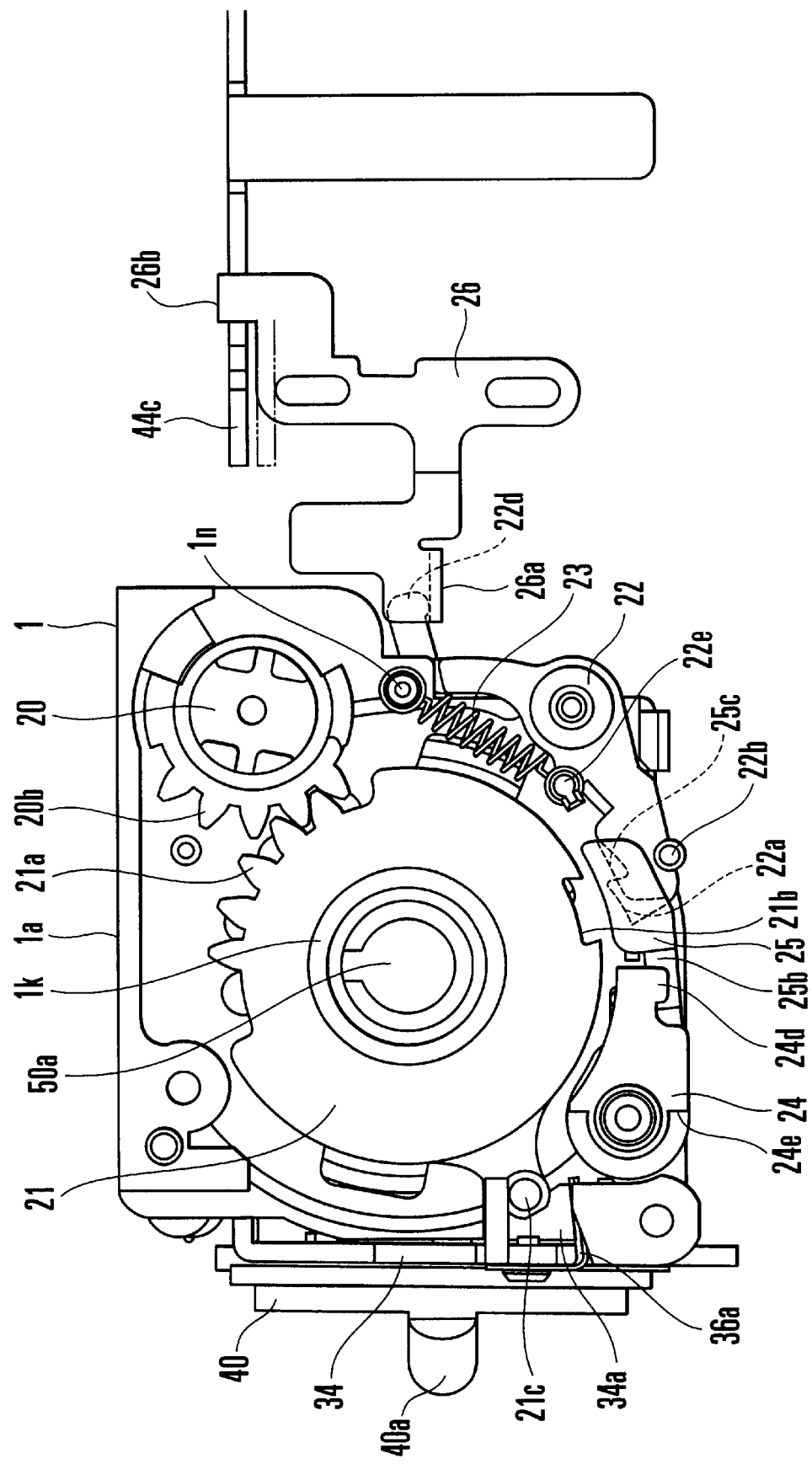
FIG. 8 is a top view showing the state in which, in the camera according to the embodiment of the invention, with the film cartridge loaded and the lens barrel unit moved to a second non-photo-taking position, the driving ring is unlocked.
Figure 9:
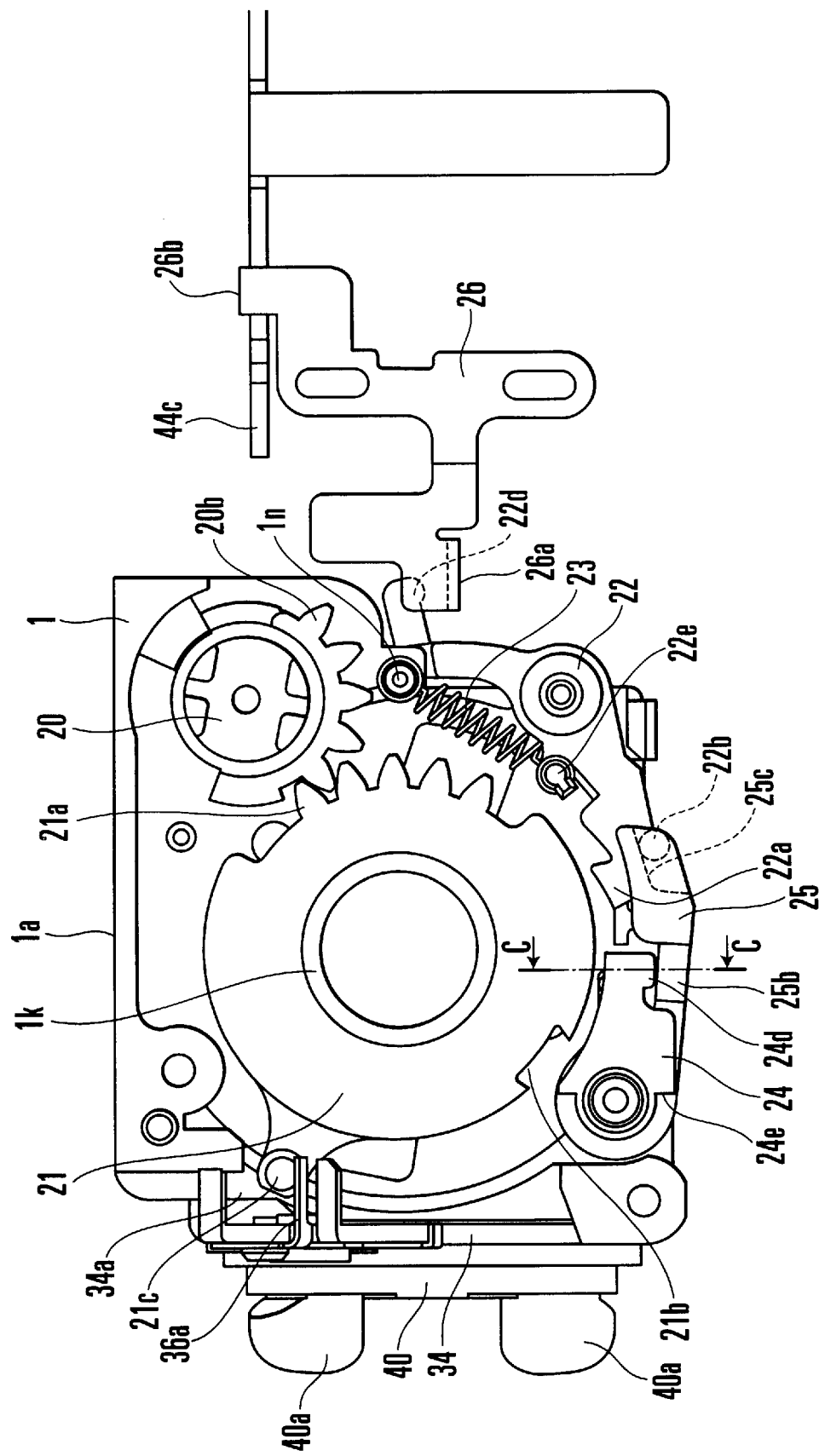
FIG. 9 is a top view showing the state in which, in the camera according to the embodiment of the invention, the film cartridge is ejected and removed.
Figure 10:
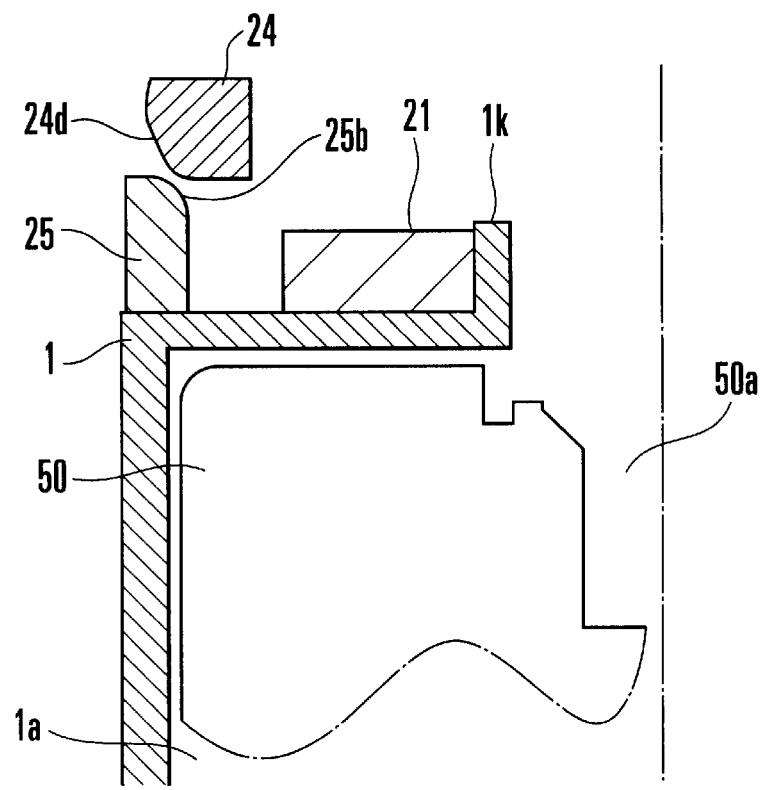
FIG. 10 is a sectional view taken on a line B—B in FIG. 7, showing a relation obtained between an ejection lever and a first release lever in the camera according to the embodiment of the invention.
Figure 11:
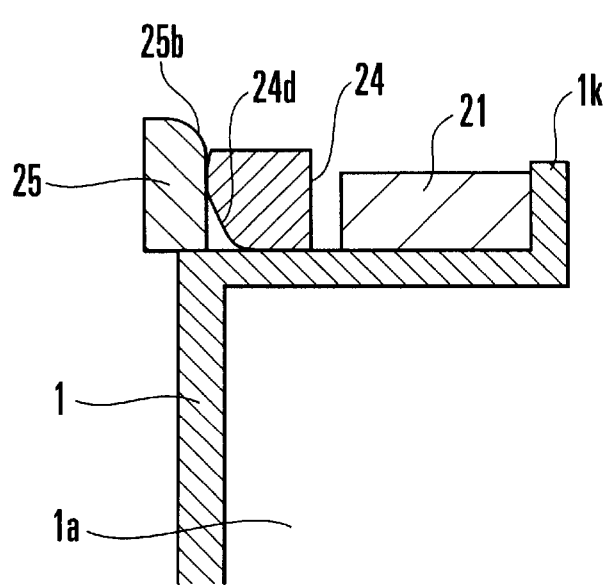
FIG. 11 is a sectional view taken on a line B—B in FIG. 8 (corresponding to the line B—B in FIG. 7), showing a relation obtained between the ejection lever and the first release lever in the camera according to the embodiment of the invention.
Figure 12:
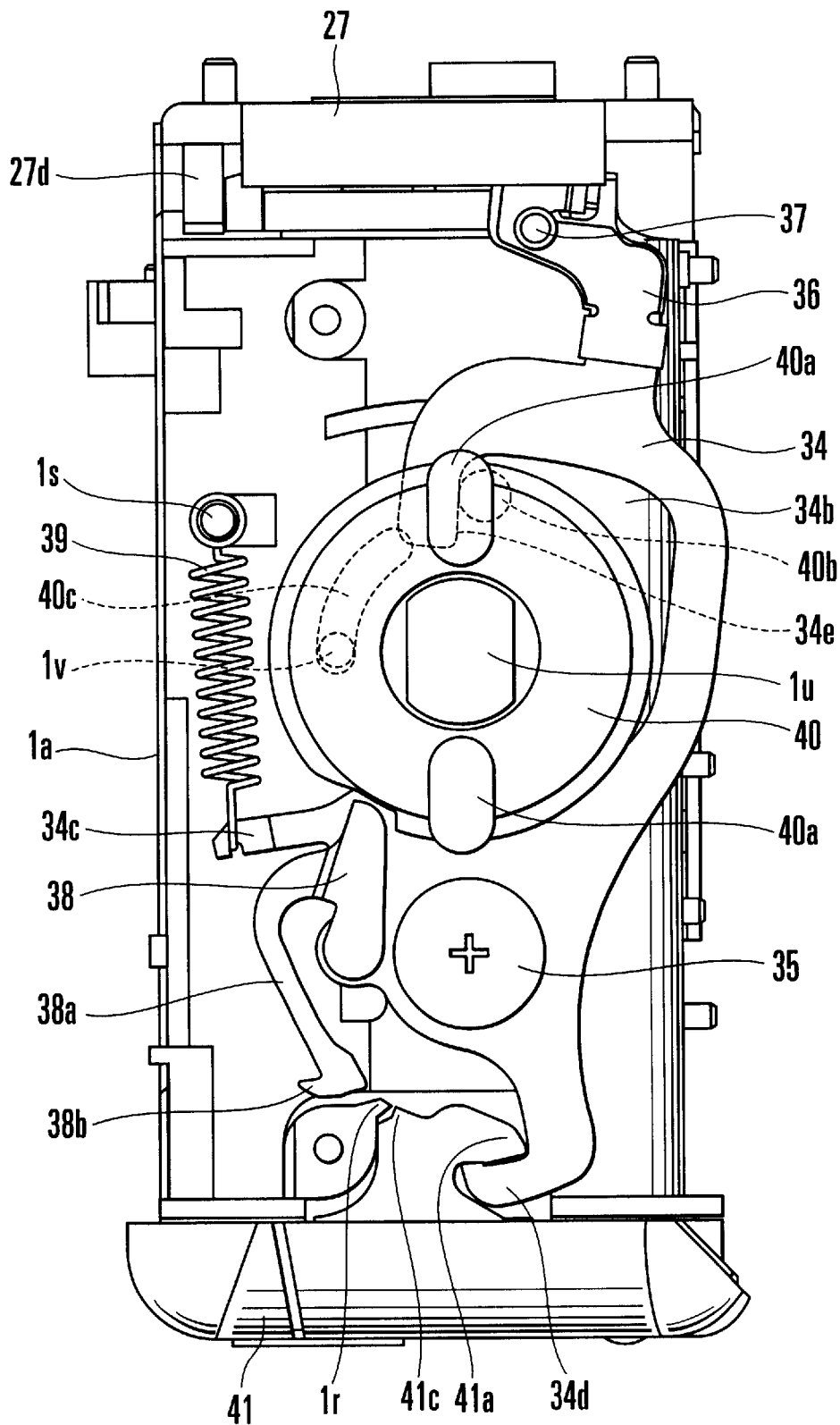
FIG. 12 is a side view showing the state in which the cartridge chamber lid is locked in the camera according to the embodiment of the invention.
Figure 13:
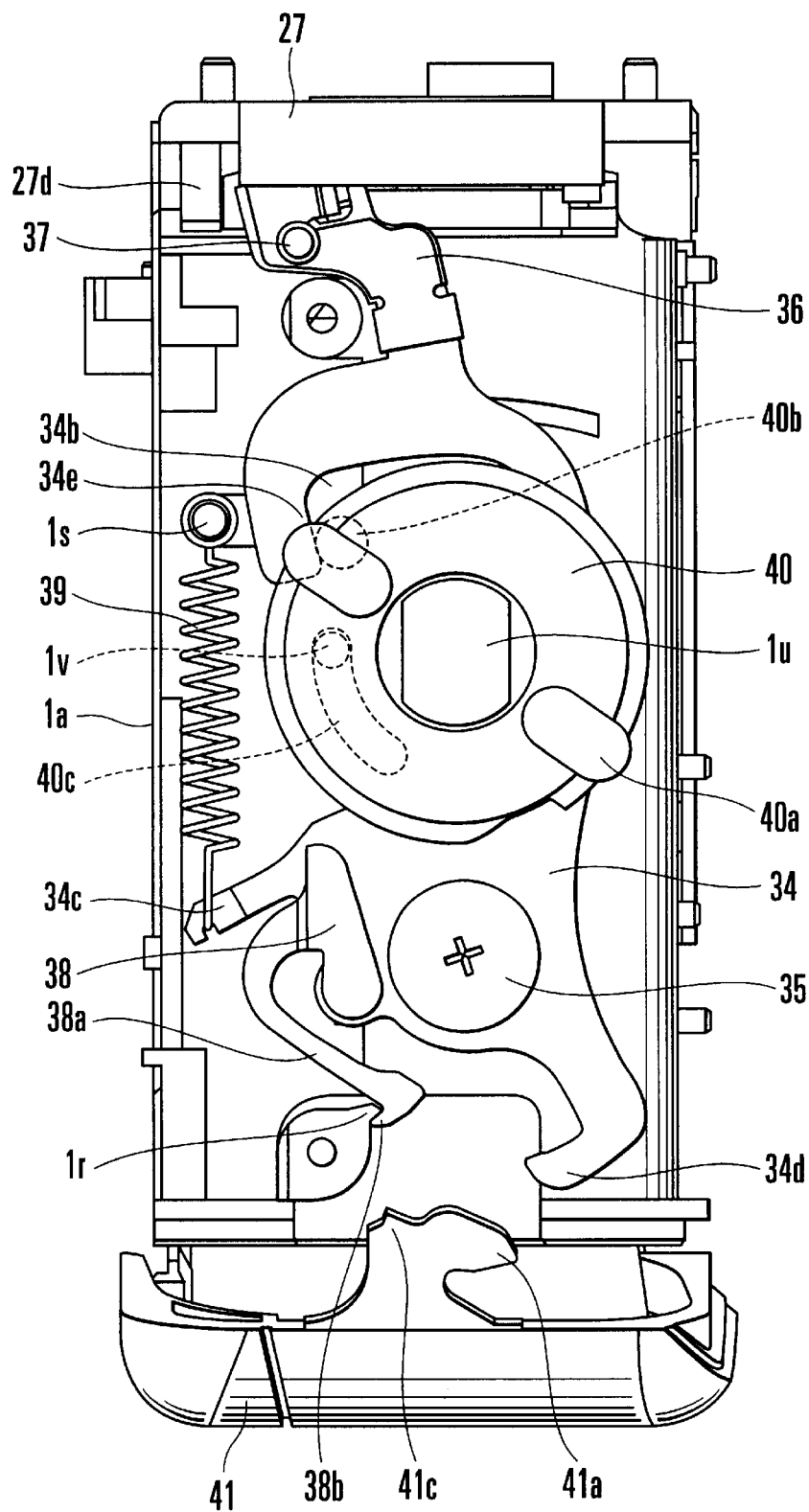
FIG. 13 is a side view showing the state in which the cartridge chamber lid is unlocked in the camera according to the embodiment of the invention.
Figure 14:
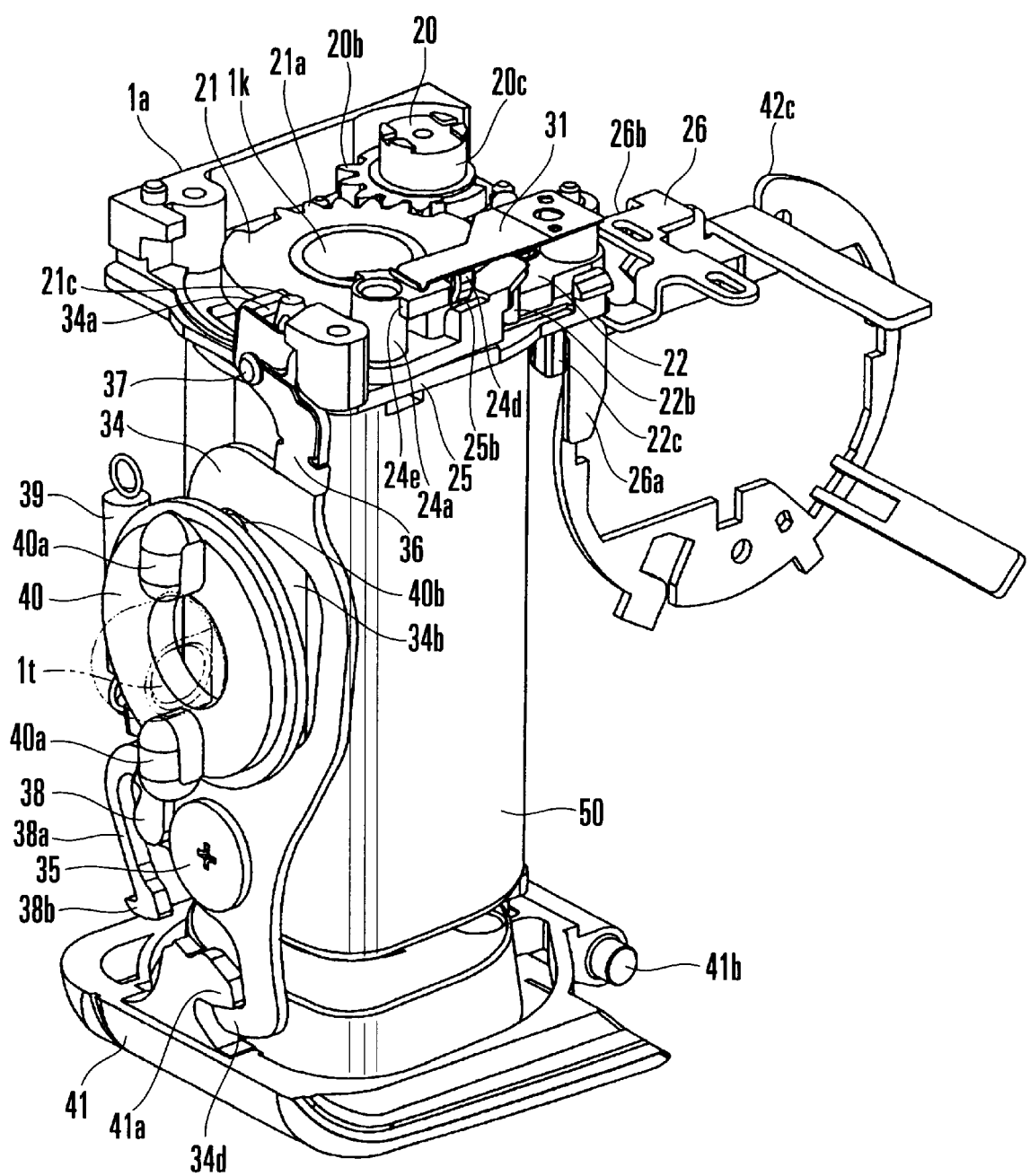
FIG. 14 is a perspective view showing the state in which the film cartridge is loaded in the cartridge chamber in the camera according to the embodiment of the invention.
Figure 15:
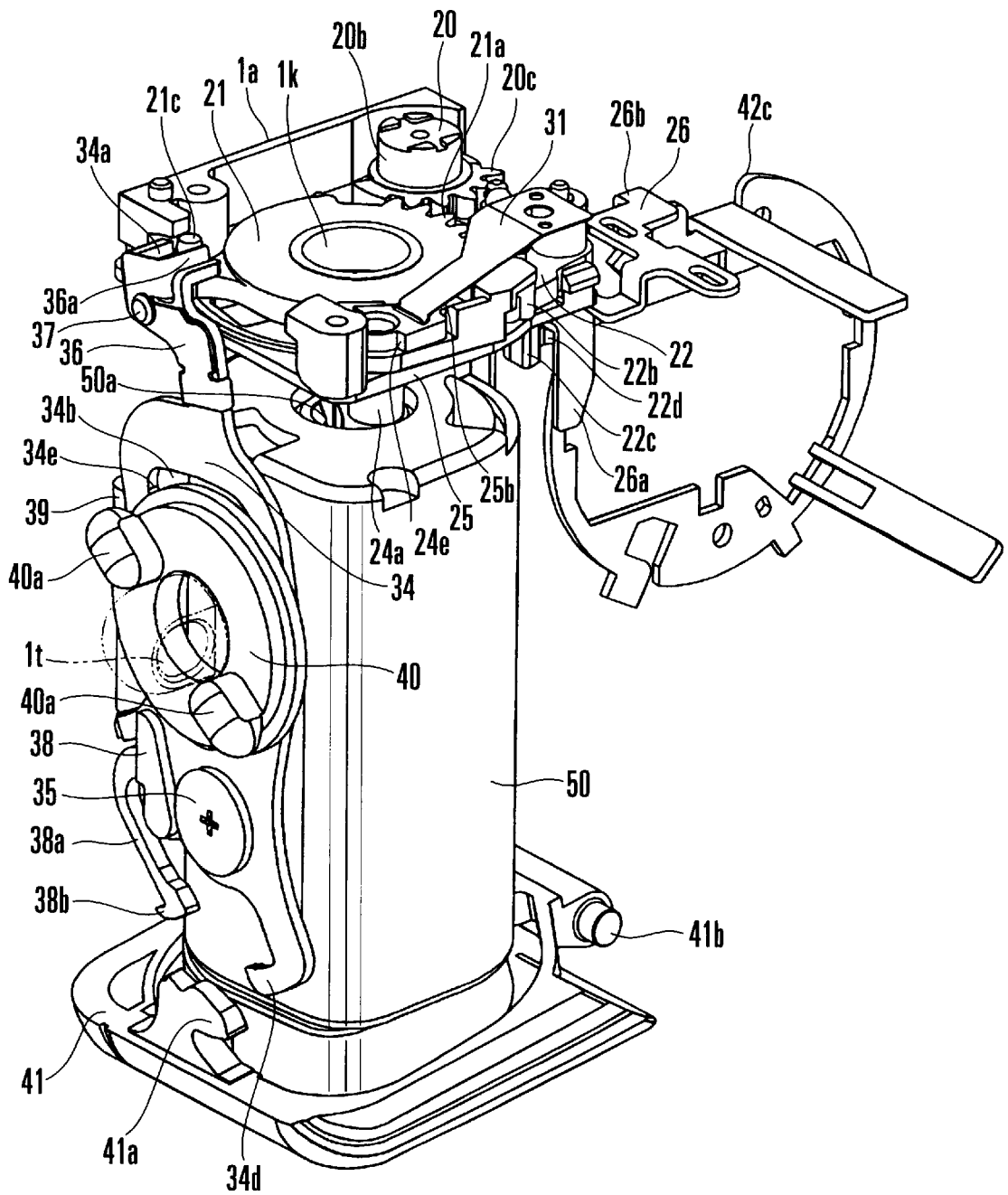
FIG. 15 is a perspective view showing the state in which the film cartridge is in the process of being taken out from the cartridge chamber in the camera according to the embodiment of the invention.

FIGS. 7, 8 and 9 are top views showing the operating states of parts of the light-blocking door opening-closing device, the cartridge chamber lid lock device and the cartridge chamber lid opening-closing device. More specifically, FIG. 7 shows the state in which, with a film cartridge 50 loaded and a lens barrel unit 44 moved to a first non-photo-taking position, a driving ring 21 is locked. FIG.. 8 shows the state in which, with the film cartridge 50 loaded and the lens barrel unit 44 moved to a second non-photo-taking position, the driving ring 21 is unlocked. FIG. 9 shows the state in which the film cartridge 50 is ejected and removed. Further, FIG. 10 is a sectional view taken on a line B—B in FIG. 7, showing a relation obtained between an ejection lever 24 and a first release lever 25. FIG. 11 is a sectional view taken on a line B—B in FIG. 8 (corresponding to the line B—B of FIG. 7), showing a relation between the ejection lever 24 and the first release lever 25. FIGS. 12 and 13 are side views showing the operating states of the cartridge chamber lid opening-closing device. More specifically, FIG. 12 shows the state in which the cartridge chamber lid 41 is locked, and FIG. 13 shows the state in which the cartridge chamber lid 41 is unlocked. FIGS. 14 and 15 are perspective views showing the operating states of the light-blocking door opening-closing device, the cartridge chamber lid lock device, the cartridge ejecting device and the cartridge chamber lid opening-closing device. More specifically, FIG. 14 shows the state in which the film cartridge 50 is loaded in a cartridge chamber 1a, and FIG. 15 shows the state in which the film cartridge 50 is in the process of being taken out from the cartridge chamber 1a.

The arrangement of the film transport device is first described below. The film transport device is arranged to wind and rewind the film which is stowed inside the film cartridge.

Referring to FIGS. 1 and 2, a camera body 1 is provided with the film cartridge chamber 1a for placing therein the film cartridge 50, and a take-up spool chamber 1b for winding the film pulled out from the inside of the film cartridge 50. A transport motor 2 is used as a drive source for winding and rewinding the film and thrusting the film out from the film cartridge 50, in which a reader part of the film is stowed, toward the take-up spool chamber 1b of the camera body 1. The transport motor 2 has a pinion gear 3 press-fitted into its fore end and is secured to a motor base plate 5 with two screws 4. The motor base plate 5 holds the transport motor 2 and is secured, with two screws 6, to the upper surface part of the take-up spool chamber 1b of the camera body 1.

A take-up gear 7 is composed of a large gear 7a and a small gear (not shown), which are formed integrally with each other. With the large gear 7a meshing with the pinion gear 3, the driving force of the transport motor 2 is transmitted to the take-up gear 7. The take-up gear 7 is rotatably fitted on a gear shaft 5a formed on the motor base plate 5 and is held on the motor base plate 5 by a take-up gear keep plate 8. The take-up gear keep plate 8 is secured to the motor base plate 5 with a screw 9 in the state of holding the take-up gear 7.

A sun gear 10 is composed of a large gear 10a and a small gear 10b, which are formed integrally with each other. With the large gear 10a meshing with the small gear of the take-up gear 7, the driving force of the transport motor 2 is transmitted to the sun gear 10. The sun gear 10 is disposed on the upper side of a planet gear unit 11. The sun gear 10 is rotatably fitted on a gear shaft 1c formed on the camera body 1 and is held in position on the camera body 1 by the take-up gear keep plate 8.

The planet gear unit 11 has a planet gear 11a which is rotatably supported thereon. With the planet gear 11a meshing with the small gear 10b of the sun gear 10, the driving force of the transport motor 2 is transmitted to the planet gear unit 11. With the driving force of the transport motor 2 transmitted, the planet gear unit 11 swings clockwise around the gear shaft 1c of the camera body 1. The clockwise swing of the planet gear unit 10 causes the planet gear 11a to mesh with the gear 12a of a take-up spool 12. When the planet gear unit 11 swings counterclockwise around the gear shaft 1c of the camera body 1, the planet gear 11a is caused to mesh with a first rewinding gear 13. The planet gear unit 11 is disposed beneath the sun gear 10 and is swingably fitted on the gear shaft 1c of the camera body 1 in the same manner as the sun gear 10. The planet gear unit 11 is thus held on the camera body 1 by the take-up gear keep plate 8.

The take-up spool 12 is disposed inside the take-up spool chamber 1b of the camera body 1 to take up and wind thereon a film stowed within the film cartridge 50. The take-up spool 12 has the gear 12a formed at its upper end part. When the gear 12a meshes with the planet gear 11a of the planet gear unit 11, which has swung clockwise, the driving force of the transport motor 2 is transmitted to the planet gear unit 11. The take-up spool 12 is rotatably fitted into holes 1d formed in the upper and lower surfaces of the take-up spool chamber 1b of the camera body 1 and is thus held in place in the camera body 1 by means of the motor base plate 5.

When the first rewinding gear 13 meshes with the planet gear 11a of the planet gear unit 11, which has swung counterclockwise, the driving force of the transport motor 2 is transmitted to the first rewinding gear 13. The first rewinding gear 13 is rotatably fitted on a gear shaft 1f formed on the camera body 1 and is held in place in the camera body 1 by means of the motor base plate 5. A clutch gear unit 14 is composed of three gears 14a, 14b and 14c and a spring (not shown) which is disposed between the gears 14b and 14c. The gear 14a is arranged to mesh with the first rewinding gear 13, the gear 14b is arranged to mesh with the sun gear 10, and the gear 14c is arranged to mesh with a second rewinding gear 15, thereby transmitting the driving force of the transport motor 2. The clutch gear unit 14 has its one end rotatably fitted into a hole 1g formed in the camera body 1 and the other end into a hole (not shown) formed in a viewfinder unit 46, which will be described later.

In addition to the second rewinding gear 15, there are arranged a third rewinding gear 16 and a fourth rewinding gear 17. The fourth rewinding gear 17 is composed of a large gear 17a and a small gear 17b which are formed integrally with each other. The second rewinding gear 15 is arranged to mesh with the gear 14c of the clutch gear unit 14, the third rewinding gear 16 is arranged to mesh with the second rewinding gear 15, and the small gear 17b of the fourth rewinding gear 17 is arranged to mesh with the third rewinding gear 16, thereby transmitting the driving force of the transport motor 2. The second, third and fourth rewinding gears 15, 16 and 17 are rotatably fitted on and held by gear shafts 1h, 1i and 1j, respectively, which are formed on the camera body 1. The second and third rewinding gears 15 and 16 are held in place on the camera body 1 by the viewfinder unit 46, and the fourth rewinding gear 17 is held in place on the camera body 1 by a fork gear keep plate 27.

A fifth rewinding gear 18 is arranged to have the driving force of the transport motor 2 transmitted thereto by meshing with the large gear 17a of the fourth rewinding gear 17. The fifth rewinding gear 18, which is disposed above the gear part 20b of a light-blocking door opening-closing gear 20, is rotatably fitted on a fitting engagement shaft 20c which is formed coaxially with the rotation center axis of the light-blocking door opening-closing gear 20, and is held in place at the light-blocking door opening-closing gear 20 by the fork gear keep plate 27.

A fork gear 19 is provided for driving a spool 50a of the film cartridge 50, which is shown in FIG. 2. With the fork gear 19 meshing with the fifth rewinding gear 18, the driving force of the transport motor 2 is transmitted to the fork gear 19. With the driving force of the transport motor 2 transmitted, the fork gear 19 rotates clockwise or counterclockwise. The clockwise rotation of the fork gear 19 causes the film to be sent out from the inside of the film cartridge 50 into the take-up spool chamber 1b of the camera body 1. The counterclockwise rotation of the fork gear 19 causes the film to be rewound back into the film cartridge 50. The fork gear 19 has an engaging part 19a extending downward. The engaging part 19a of the fork gear 19 is rotatably fitted in and supported by the inner circumferential side of a cylindrical rib 1k formed on the upper surface of the cartridge chamber 1a of the camera body 1, and the fork gear 19 is held in place on the camera body 1 by the fork gear keep plate 27. The engaging part 19a of the fork gear 19 penetrates the inner circumferential side of the cylindrical rib 1k of the camera body 1 to protrude to the inside of the cartridge chamber 1a of the camera body 1. When the film cartridge 50 is placed inside the cartridge chamber 1a of the camera body 1, the engaging part 19a of the fork gear 19 engages the spool 50a of the film cartridge 50.

The fork gear keep plate 27 is provided with two fixing claws 27d and is arranged to be secured to the camera body 1 with the two fixing claws 27d engaging two fixing claws 1p which are formed on the upper surface part of the cartridge chamber 1a of the camera body 1.

The arrangement of the light-blocking door opening-closing device is next described.

The light-blocking door opening-closing device is arranged to open or close a light-blocking door 50b provided on the film cartridge 50 and also to turn on and off the transport motor 2, in association with the action of the cartridge chamber lid opening-closing device.

Referring to FIGS. 1 and 2, a light-blocking door opening-closing gear 20 is arranged to open and close the light-blocking door 50b of the film cartridge 50, which is shown in FIG. 2. The light-blocking door opening-closing gear 20 has a light-blocking door opening-closing shaft 20a extending downward to fit into a hole 11 formed on the upper surface part of the cartridge chamber 1a of the camera body 1 and also has a fitting engagement shaft 20c formed coaxially with the rotation center axis of the light-blocking door opening-closing gear 20 and fitted into a hole 27a which is formed in the fork gear keep plate 27. The light-blocking door opening-closing gear 20 is thus supported in a rotatable state. The light-blocking door opening-closing shaft 20a penetrates the hole 11 of the camera body 1 and protrudes into the cartridge chamber 1a of the camera body 1. When the film cartridge 50 is placed inside the cartridge chamber 1a of the camera body 1, the light-blocking door opening-closing shaft 20a engages a light-blocking door driving part 50c of the film cartridge 50. The gear part 20b, which is formed at a middle part of the light-blocking door opening-closing gear 20, is in mesh with a gear part 21a of the driving ring 21.

The driving ring 21 is arranged to cause the light-blocking door opening-closing gear 20 to rotate. The driving ring 21 is rotatably fitted on the outer circumferential side of the cylindrical rib 1k formed on the upper surface part of the cartridge chamber 1a of the camera body 1 and is held in place on the camera body 1 by means of the fork gear 19. The gear part 21a, a cutout part 21b and a driving shaft 21c are formed on the outer circumferential side of the driving ring 21. The gear part 21a is arranged to transmit the rotating force of the driving ring 21 to the light-blocking door opening-closing gear 20 by meshing with the gear part 20b of the light-blocking door opening-closing gear 20. The cutout part 21b is arranged to allow the lock claw 22a of a lock lever 22 to intrude into the cutout part 21b. The driving shaft 21c is fitted into a cutout part 34a provided in an opening-closing lever 34.

A switch lever 28 is disposed on the upper surface part of the fork gear keep plate 27 to operate a light-blocking door opening-closing switch 33 and is secured to the light-blocking door opening-closing gear 20 with a screw 29. The switch lever 28 is thus arranged to rotate integrally with the light-blocking door opening-closing gear 20. A pushing part 28a and a hook 28b are formed on the switch lever 28. The pushing part 28a is arranged to push a contact piece 33a of the light-blocking door opening-closing switch 33 to turn on or off the light-blocking door opening-closing switch 33. The hook 28b is arranged to have a light-blocking door opening-closing spring 30 hooked thereon.

The light-blocking door opening-closing spring 30 is arranged to urge the light-blocking door 50b of the film cartridge 50 in the opening direction and in the closing direction. One end of the light-blocking door opening-closing spring 30 is hooked on a spring peg 27e formed on the fork gear keep plate 27 and the other end is hooked on the hook 28b of the switch lever 28.

The light-blocking door opening-closing switch 33 is arranged to turn on and off in response to the movement of the pushing part 28a of the switch lever 28. Turning-on of the light-blocking door opening-closing switch 33 causes the transport motor 2 to work to send the leader part of the film out from the inside of the film cartridge 50 to the spool chamber 1b of the camera body 1. The light-blocking door opening-closing switch 33 is composed of two contact pieces 33a and 33b and an insulation plate 33c which is disposed between the contact pieces 33a and 33b. The light-blocking door opening-closing switch 33 which is arranged in this manner is secured to the fork gear keep plate 27.

The arrangement of the cartridge chamber lid lock device is next described.

When the camera is in a state of having the film cartridge 50 placed inside the cartridge chamber 1a of the camera body 1, the cartridge chamber lid lock device works to lock or unlock the cartridge chamber lid opening-closing device.

Referring to FIG. 1, the lock lever 22 is arranged to prevent an operation knob 40 (shown in FIG. 4) from being turned, by preventing the driving ring 21 from rotating when the camera is in a photo-taking state with the film cartridge 50 loaded inside the cartridge chamber 1a of the camera body 1. The lock lever 22 is rotatably fitted on and supported by a lever shaft 1m formed on the upper surface part of the cartridge chamber 1a of the camera body 1 and is held in place on the camera body 1 by means of the fork gear keep plate 27. The lock lever 22 is provided with the lock claw 22a, which is formed at the left end part thereof, a driving shaft 22b, which is formed in the neighborhood of the lock claw 22a, a driving part 22d formed at the fore end part of an arm part 22c which extends downward along the cartridge chamber 1a, and a spring peg 22e formed near the center of swing of the lock lever 22. The lock claw 22a is arranged to prevent the driving ring 21 from rotating, by intruding into the cutout part 21b of the driving ring 21. The driving shaft 22b is arranged to cause the first release lever 25 to swing by abutting on a tapered surface 25c of the first release lever 25. The driving part 22d is arranged to move following a second release lever 26 (shown in FIG. 3) by abutting on a pushing part 26a of the second release lever 26. A lock lever spring 23 is hooked on the spring peg 22e of the lock lever 22.

The lock lever spring 23 is arranged to urge the lock claw 22a of the lock lever 22 in the direction of intruding into the cutout part 21b of the drive ring 21 to lock the driving ring 21. The lock lever spring 23 has one end thereof hooked on a spring peg 1n formed on the upper surface part of the cartridge chamber 1a of the camera body 1 and the other end hooked on the spring peg 22e of the lock lever 22.

The first release lever 25 is arranged to unlock the driving ring 21 by swinging, following the movement of the ejection lever 24, in such a way as to cause the lock lever 22 to swing. The first release lever 25 is disposed below the ejection lever 24 and is fitted on and supported by an ejection shaft 24a of the ejection lever 24. The first release lever 25 has a tapered surface 25b at its middle part and another tapered surface 25c at its right end part. The tapered surface 25b is arranged to follow the movement of the ejection lever 24 by abutting on a tapered surface 24d of the ejection lever 24. The tapered surface 25c is arranged to restrict the swing of the lock lever 22 by abutting on the driving shaft 22b of the lock lever 22.

Referring to FIG. 3, the second release lever 26 causes the lock lever 22 to swing by making a rectilinear motion in the optical axis direction while following the movement of a rectilinear motion guide plate 44c. The driving ring 21 is locked or unlocked with the lock lever 22 thus caused to swing. The second release lever 26 is slidably fitted on and supported by two fitting engagement shafts 44a formed on the upper surface part of the lens barrel unit 44. The second release lever 26 which is arranged in this manner is held in place jointly by the camera body 1 and the viewfinder unit 46. Further, the second release lever 26 is provided with a pushing part 26a formed on its front side and a driving part 26b formed on its rear side. The pushing part 26a of the second release lever 26 is arranged to cause the lock lever 22 to swing counterclockwise by abutting on the driving part 22d of the lock lever 22. The driving part 26b of the second release lever 26 is arranged to follow the movement of the rectilinear motion guide plate 44c by abutting on the rectilinear motion guide plate 44c.

The arrangement of the cartridge ejecting device is next described.

The cartridge ejecting device is arranged to perform an unlocking action on the cartridge chamber lid lock device in addition to ejecting and discharging the film cartridge 50 from the cartridge chamber 1a.

Referring to FIG. 1, the ejection lever 24 is arranged to vertically move in association with the movement of the film cartridge 50 placed inside the cartridge chamber 1a to eject the film cartridge 50 to a predetermined extent from the cartridge loading opening (port) of the cartridge chamber 1a and, at the same time, to unlock the driving ring 21 by causing the first release lever 25 and the lock lever 22 to swing. The ejection lever 24 is disposed above the first release lever 25. The ejection shaft 24a, which is formed on the ejection lever 24, pierces through a hole 25a formed in the first release lever 25. A hole 1o formed on the upper surface part of the cartridge chamber 1a of the camera body 1 and a hole 24b formed coaxially with the ejection shaft 24a are fitted on a fitting engagement shaft 27b formed on the fork gear keep plate 27. The ejection lever 24 is thus slidably supported by these parts. Further, the ejection lever 24 has the ejection shaft 24a formed at the left end part thereof, the tapered surface 24d formed at a right fore end part of the arm part 24c, and guide walls 24e formed on two sides of the ejection shaft 24a. The ejection shaft 24a penetrates the hole 25a of the first release lever 25 and the hole 1o of the camera body 1 to protrude into the cartridge chamber 1a of the camera body 1. The ejection lever 24 is thus arranged to abut on the film cartridge 50, which has been placed inside the cartridge chamber 1a. The above-stated tapered surface 24d is abutting on the tapered surface 25b of the first release lever 25 in such a way as to have the first release lever 25 caused to swing by a vertical movement of the ejection lever 24. The guide walls 24e are abutting on a guide shaft 27c which is formed near to the fitting engagement shaft 27b of the fork gear 27 to prevent the ejection lever 24 from swinging.

An ejection lever spring 31, which is made of a leaf spring, is arranged to urge the ejection shaft 24a of the ejection lever 24 to protrude into the cartridge chamber 1a. The ejection lever spring 31 is secured to the fork gear keep plate 27 with a screw 32.

The arrangement of the cartridge chamber lid opening-closing device is described.

The cartridge chamber lid opening-closing device is arranged to open and close the light-blocking door opening-closing device as well as to open and close the cartridge chamber lid 41.

Referring to FIGS. 4 to 6 and FIG. 12, the opening-closing lever 34 is arranged to open and close the cartridge chamber lid 41 and also to cause the driving ring 21 to rotate. The opening-closing lever 34 is swingably fitted on and supported by a lever shaft 1q formed on a side surface of the cartridge chamber 1a of the camera body 1 and is held in place by the camera body 1 with a screw 35. The opening-closing lever 34 is provided with a U-shaped cutout part 34a which is bent at the upper end part thereof, a cutout part 34b and a hook 34c which are formed about at the middle part thereof, and a lock claw 34d which is formed at the lower end part thereof. The cutout part 34a is fitted on the driving shaft 21c of the driving ring 21 to transmit the swinging force of the opening-closing lever 34 to the driving ring 21. The cutout part 34b is arranged to follow the movement of the operation knob 40 by abutting on a driving part 40b of the operation knob 40. On the hook 34c is hooked an opening-closing lever spring 39. The lock claw 34d is arranged to lock the lock claw 41a of the cartridge chamber lid 41.

An opening-closing lever spring 36, which is made of a leaf spring, has a pushing part 36a formed at a fore end part thereof. The pushing part 36a is disposed inside the cutout part 34a of the opening-closing lever 34 and is arranged to cause the driving ring 21 to rotate counterclockwise by pushing the driving shaft 21c of the driving ring 21. The opening-closing lever spring 36 is secured to the opening-closing lever 34 by means of a pin 37 and is thus arranged to move together with the opening-closing lever 34. A lock lever 38 is arranged to keep the lock claw 34d of the opening-closing lever 34 in a state of releasing the lock claw 41a of the cartridge chamber lid 41. The lock lever 38 is secured to the opening-closing lever 34 and is thus arranged to move together with the opening-closing lever 34. The lock lever 38 is provided with a lock claw 38b which is formed at the fore end part of an arm part 38a of the lock lever 38. The lock claw 38b is arranged to engage a lock claw 1r formed at the side surface part of the cartridge chamber 1a of the camera body 1.

The opening-closing lever spring 39 is arranged to urge the lock claw 34d of the opening-closing lever 34 to move in the direction of engaging the lock claw 41a of the cartridge chamber lid 41. One end of the opening-closing lever spring 39 is hooked on a spring peg is formed on the side surface part of the cartridge chamber 1a of the camera body 1, and the other end thereof is hooked on the hook 34c of the opening-closing lever 34.

The operation knob 40 is provided with operation parts 40a which are arranged to be manually operated by the user so as to cause the opening-closing lever 34 to swing in opening or closing the cartridge chamber lid 41. The operation knob 40 is disposed on one side of the opening-closing lever 34, is rotatably fitted on and supported by a strap shaft 1u formed on the side surface part of the cartridge chamber 1a of the camera body 1 and, as shown in FIGS. 5 and 6, is held in place on the camera body 1 by means of covers 42 and 43. Further, the operation knob 40 is provided with the driving part 40b, which is formed at a position opposed to the operation parts 40a, and a rotation restricting groove 40c, which is formed in the neighborhood of the driving part 40b. The driving part 40b is arranged to drive the opening-closing lever 34 by abutting on the inside surface 34e of the cutout part 34b of the opening-closing lever 34. The rotation restricting groove 40c is fitted on a rotation restricting shaft 1v, which is formed in the neighborhood of the strap shaft 1u of the camera body 1.

The cartridge chamber lid 41 is disposed, as shown in FIG. 12, on the lower side of the cartridge chamber 1a of the camera body 1. The cartridge chamber lid 41 is arranged to hold the film cartridge 50 loaded inside the cartridge chamber 1a and to cover a cartridge loading opening part formed in the cartridge chamber 1a. The cartridge chamber lid 41 has rotation shafts 41b which are formed on its two sides (see FIGS. 14 and 15) and are supported in a rotatable manner by grooves (not shown) which are formed in the camera body 1. The cartridge chamber lid 41 is thus held in place on the camera body 1 by the covers 42 and 43. Further, the cartridge chamber lid 41 is provided with a lock claw 41a, which is formed at a position opposed to the rotation shafts 41b, and a projection 41c, which is formed on a side opposite to the side on which the lock claw 41a is formed. The lock claw 41a is arranged to be locked by the lock claw 34d of the opening-closing lever 34. The projection 41c is arranged to release the lock lever 38 from a state of being locked by the lock claw 1r of the camera body 1.

The arrangement of principal parts of the camera is next described.

Referring to FIG. 3, the lens barrel unit 44 is arranged to be movable to a photo-taking position, a first non-photo-taking position and a second non-photo-taking position. When the lens barrel unit 44 is at the first non-photo-taking position, a barrier device 44b, which is provided in the lens barrel unit 44, is operated to be opened or closed. When the lens barrel unit 44 is at the second non-photo-taking position, the lens barrel unit 44 is drawn further inward from the first non-photo-taking position, thereby unlocking the driving ring 21. In the lens barrel unit 44, there is provided with the rectilinear motion guide plate 44c, which is movable rectilinearly in the optical axis direction to prevent a photo-taking optical system (not shown) from rotating (see FIGS. 7, etc.). The second release lever 26 is arranged to be moved by the rectilinear motion guide plate 44c. The lens barrel unit 44 is disposed in front of the camera body 1 and is secured to the camera body 1 with four screws 45.

The viewfinder unit 46 includes a viewfinder optical system 46a. A light projecting part 46b and a light receiving part 46c of a focusing distance measuring device are arranged in a known manner on two sides of the viewfinder optical system 46a. The viewfinder unit 46 is disposed above the lens barrel unit 44 and is secured to the camera body 1 with three screws 47. A flash light emitting unit 48 is arranged to be movable between its light emitting position and its stowed position. The flash light emitting unit 48 is disposed above the take-up spool chamber 1b of the camera body 1 and is secured to the camera body 1 with three screws 49.

Next, locking, opening and closing actions on the cartridge chamber lid 41 are described below with reference to FIGS. 7 to 15.

The film cartridge 50 is provided with a using state indicator (not shown) which is arranged to indicate the using state (a half-used state or a completely-used state) of a film stowed in the film cartridge 50. After the film is rewound back into the film cartridge 50, the using state indicator of the film cartridge 50 is set. After completion of the setting, the lens barrel unit 44 shown in FIG. 3 is drawn inward in the optical axis direction from the position shown in FIG. 7 to the second non-photo-taking position. According to the movement of the lens barrel unit 44, the second release lever 26 follows the rectilinear motion guide plate 44c to move in the direction of an arrow X in FIG. 7, while being guided by the fitting engagement shaft 44a of the lens barrel unit 44 (see FIG. 3), to the second non-photo-taking position (see FIG. 8) in the same manner as the lens barrel unit 44. The movement of the second release lever 26 in the direction of the arrow X causes the lock lever 22 to swing counterclockwise around the lever shaft 1m of the camera body 1 while charging the lock lever spring 23. The swing of the lock lever 22 then causes the lock claw 22a of the lock claw 22, which has intruded into the cutout part 21b of the driving ring 21 as shown in FIG. 7, to retreat from the cutout part 21b to bring about an unlocked state. In the unlocked state, the operation knob 40 can be turned.

If the operation knob 40, which has become turnable, is rotated counterclockwise around the strap shaft 1u of the camera body 1 from the state shown in FIG. 12, the rotating force of the operation knob 40 is transmitted to the end surface 34e of the opening-closing lever 34 through the driving part 40b of the operation knob 40. The opening-closing lever 34 then swings counterclockwise, similarly to the operation knob 40, around the lever shaft 1q of the camera body 1 from the state shown in FIG. 12 while charging the opening-closing lever spring 39. Then, the swinging force of the opening-closing lever 34 is transmitted, through the opening-closing lever spring 36, to the driving shaft 21c of the driving ring 21 (see FIG. 8). As a result, the driving ring 21 begins to rotate clockwise around the rib 1k of the camera body 1. Then, the rotating force of the driving ring 21 is transmitted, through the gear 21a of the driving ring 21, to the gear 20b of the light-blocking door opening-closing gear 20. With the driving force transmitted, the light-blocking door opening-closing gear 20 rotates around the hole 11 of the camera body 1 and the hole 27a of the fork gear keep plate 27 while charging the light-blocking door opening-closing spring 30. By this rotation, the light-blocking door 50b of the film cartridge 50 is closed. At this time, the pushing part 28a of the switch lever 28, which rotates together with the light-blocking door opening-closing gear 20, moves away from the fore end part of the contact piece 33a of the light-blocking door opening-closing switch 33, so that the contact piece 33a abuts on the contact piece 33b of the light-blocking door opening-closing switch 33. The light-blocking door opening-closing switch 33 is thus turned on.

Further, as shown in FIGS. 13 and 15, the above-stated counterclockwise swing of the opening-closing lever 34 releases the lock claw 41a of the cartridge chamber lid 41 from the state of being locked by the lock claw 34d of the opening-closing lever 34. This brings about a state in which an opening operation on the cartridge chamber lid 41 can be performed. The ejection lever 24 is then caused by the spring force of the ejection lever spring 31 to move downward from the state shown in FIG. 14, as shown in FIG. 15, under the guidance of the hole 1o of the camera body 1 and the fitting engagement shaft 27b of the fork gear keep plate 27. The downward movement of the ejection lever 24 causes the ejection shaft 24a of the ejection lever 24 to eject and discharge in part the film cartridge 50 from the inside of the cartridge chamber 1a of the camera body 1. The cartridge chamber lid 41 is thus caused to open by the film cartridge 50. With the cartridge chamber lid 41 thus opened, the film cartridge 50 can be taken out from the cartridge chamber 1a of the camera body 1.

At this time, the tapered surface 25b of the first release lever 25 is pushed by the tapered surface 24d of the ejection lever 24, as shown in FIG. 11. The first release lever 25 is thus caused to swing clockwise. Then, the tapered surface 25c of the first release lever 25 comes to abut on the driving shaft 22b of the lock lever 22, as shown in FIG. 9, to prevent the lock lever 22 from making any swinging motion.

Further, since the lock claw 38b of the lock lever 38 is locked by the lock claw 1r of the camera body 1, the opening-closing lever 34 is kept in a state of charging the opening-closing lever spring 39, as shown in FIG. 13.

A closing action on the cartridge chamber lid 41 performed with the film cartridge 50 loaded and a closing action on the cartridge chamber lid 41 with no film cartridge loaded are next described separately from each other below.

In closing the cartridge chamber lid 41 with the film cartridge 50 loaded inside the cartridge chamber 1a, the camera operates as follows.

With the film cartridge 50 loaded and placed inside the cartridge chamber 1a of the camera body 1, the cartridge chamber lid 41 is swung in the direction of closing. The swing of the cartridge chamber lid 41 causes the projection 41c of the cartridge chamber lid 41 to release the lock claw 38b of the lock lever 38, which has been locked by the lock claw 1r of the camera body 1. With the lock claw 38b released, the opening-closing lever 34 swings clockwise around the lever shaft 1q of the camera body 1 from the position shown in FIG. 13 under the spring force of the opening-closing lever spring 39. The swing of the opening-closing lever 34 causes the lock claw 41a of the cartridge chamber lid 41 to be locked by the lock claw 34d of the opening-closing lever 34, as shown in FIG. 12. The cartridge chamber lid 41 is thus closed to keep the film cartridge 50 inside the cartridge chamber 1a.

In this instance, the ejection shaft 24a of the ejection lever 24 is pushed by the film cartridge 50 placed inside the cartridge chamber 1a of the camera body 1. The pushing force from the film cartridge 50 causes the ejection lever 24 to move upward from the position shown in FIG. 15 to the position shown in FIG. 14, while charging the ejection lever spring 31, under the guidance of the hole 1o of the camera body 1 and the fitting engagement shaft 27b of the fork gear keep plate 27. The upward movement of the ejection lever 24 causes the tapered surface 24d of the ejection lever 24 and the tapered surface 25b of the first release lever 25 to part from each other. The first release lever 25 is thus set free as shown in FIG. 10.

Further, the swinging force of the opening-closing lever 34 is transmitted to the driving part 40b of the operation knob 40 through the end surface 34e of the opening-closing lever 34 and also to the driving shaft 21c of the driving ring 21 through the cutout part 34a of the opening-closing lever 34. The operation knob 40, to which the swinging force of the opening-closing lever 34 has been transmitted, rotates clockwise, similarly to the opening-closing lever 34, around the strap shaft 1u of the camera body 1 from the position shown in FIG. 13. Further, the driving ring 21 rotates counterclockwise around the rib 1k of the camera body 1 from the position shown in FIG. 9 (see FIG. 8). The rotating force of the driving ring 21 is transmitted to the gear part 20b of the light-blocking door opening-closing gear 20 through the gear part 21a of the driving gear 21. The light-blocking door opening-closing gear 20, to which the rotating force of the driving ring 21 has been transmitted, rotates clockwise around the hole 11 of the camera body 1 and the hole 27a of the fork gear keep plate 27 while charging the light-blocking door opening-closing spring 30. The light-blocking door 50b of the film cartridge 50 is opened by the rotation of the light-blocking door opening-closing gear 20. At this time, the pushing part 28a of the switch lever 28, which rotates together with the light-blocking door opening-closing gear 20, pushes the fore end part of the contact piece 33a of the light-blocking door opening-closing switch 33 to move the contact piece 33a away from the contact piece 33b. The light-blocking door opening-closing switch 33 is thus turned off. With the light-blocking door opening-closing switch 33 turned off, a control circuit (not shown) allows the lens barrel unit 44 to be drawn out in the optical axis direction from the position shown in FIG. 8 to the first non-photo-taking position.

The movement of the lens barrel unit 44 sets the second release lever 26 free by causing the second release lever 26 to part from the rectilinear motion guide plate 44c. Then, with the second release lever 26 set free, the lock lever 22 comes to swing clockwise around the lever shaft 1m of the camera body 1 under the spring force of the lock lever spring 23 from the position shown in FIG. 8. The swinging movement of the lock lever 22 brings the lock claw 22a of the lock lever 22 into the cutout part 21b of the driving ring 21 to prevent the rotation of the driving ring 21, as shown in FIG. 7. With the rotation of the driving ring 21 thus prevented, the opening-closing lever 34 and the operation knob 40 are also prevented from moving, thereby bringing about a state in which an opening operation on the cartridge chamber lid 41 is impossible (the locked state).

Further, the swinging force of the lock lever 22 is transmitted to the pushing part 26a of the second release lever 26 through the driving part 22d of the lock lever 22 and to the tapered surface 25c of the first release lever 25 through the driving shaft 22b of the lock lever 22. The second release lever 26, to which the swinging force of the lock lever 22 has been transmitted, moves to the first non-photo-taking position following the lens barrel unit 44 under the guidance of the fitting engagement shaft 44a of the lens barrel unit 44. Further, the first release lever 25 swings counterclockwise around the ejection shaft 24a of the ejection lever 24. When the lens barrel unit 44 reaches the first non-photo-taking position, the transport motor 2 is driven. Then, information on the using state of the film cartridge 50 is read, and the film is sent out from the film cartridge 50 to be wound on the take-up spool 12 of the camera body 1. The camera thus becomes ready for photo-taking.

In closing the cartridge chamber lid with no film cartridge loaded inside the cartridge chamber 1a, the camera operates as follows.

The lid closing action in this case differs from the lid closing action to be performed with the film cartridge loaded, in the following point. In this case, the ejection lever 24 is in a state of having been moved downward, as shown in FIG. 15, as the film cartridge 50 is not loaded inside the cartridge chamber 1a of the camera body 1. In other words, the film cartridge 50 is left in a state of having been ejected and removed from the inside of the cartridge chamber 1a of the camera body 1. In this state, as shown in FIG. 11, the first release lever 25 is prevented from swinging by the tapered surface 24d of the ejection lever 24. The tapered surface 25c of the first release lever 25 is in the state of abutting on the driving shaft 22b of the lock lever 22, as shown in FIG. 9, thereby preventing the lock lever 22 from swinging. Therefore, the lock claw 22a of the lock lever 22 cannot intrude into the cutout part 21b of the driving ring 21. In other words, there is obtained an unlocked state.

Therefore, even if the lens barrel unit 44 is drawn out in the optical axis direction to the first non-photo-taking position or to the photo-taking position, the driving ring 21, the opening-closing lever 34 and the operation knob 40 are movable to permit an opening operation on the cartridge chamber lid 41.

With the camera in the state mentioned above, i.e., with the film cartridge 50 not loaded in the cartridge chamber 1a of the camera body and the lens barrel unit 44 located either at the first non-photo-taking position or at the photo-taking position, when the film cartridge 50 is put into the cartridge chamber 1a, the ejection shaft 24a of the ejection lever 24 is pushed by the film cartridge 50. The ejection lever 24 is thus caused to move upward, as viewed in FIG. 14, from the position shown in FIG. 15 while charging the ejection lever spring 31. The upward movement of the ejection lever 24 causes the tapered surface 24d of the ejection lever 24 to part from the tapered surface 25b of the first release lever 25 to set the first release lever 25 in a free state (as shown in FIG. 10). By this, the lock lever 22 is released from the restraint of its swinging motion. The release from the restraint allows the lock lever 22 to be swung clockwise around the lever shaft 1m of the camera body 1 by the spring force of the lock lever spring 23 from the state shown in FIG. 9. The swinging motion of the lock lever 22 causes the second release lever 26 to move in the optical axis direction, and causes the lock claw 22a of the lock lever 22 to intrude into the cutout part 21b of the driving ring 21, thereby preventing the driving ring 21 from rotating. With the rotation of the driving ring 21 prevented, the rotation of the opening-closing lever 34 and that of the operation knob 40 are prevented, so that an opening operation on the cartridge chamber lid 41 becomes impossible, i.e., the cartridge chamber lid 41 is locked.

According to the embodiment described above, the camera is provided with lock means (including the second release lever 26, the lock lever 22, etc.) which is arranged to shift between positions for bringing the cartridge chamber lid 41 into a locked state and an unlocked state according to the moving position of the lens barrel unit 44 in the optical axis direction, and unlocking means (including the first release lever 25, the lock lever 22, etc.) which is arranged to shift to a position for bringing the cartridge chamber lid 41 into the unlocked state in association with the action of a means for ejecting the film cartridge 50 (the ejection lever 24 and the ejection lever spring 31). Further, the camera allows the cartridge chamber lid 41 to be in an openable state when the camera is not loaded with the film cartridge 50. In other words, under this condition, since the ejection lever 24 is not moved upward by the film cartridge 50 as shown in FIG. 10 (see FIG. 11), the ejection lever 24 and the first release lever 25 remain at their positions shown in FIG. 9. The driving ring 21 is released from the state of being locked by the lock lever 22, so that an opening-and-closing operation on the operation knob 40 can be performed. Therefore, the camera can be loaded with the film cartridge 50 with the lens barrel unit 44 left at the first non-photo-taking position or at the photo-taking position without moving the lens barrel unit 44 to the second non-photo-taking position. The camera according to the embodiment, therefore, gives a much better operability than the conventional arrangement.

Further, with the camera once loaded with the film cartridge 50, the cartridge chamber lid 41 cannot be opened as long as the film cartridge 50 remains in the cartridge chamber 1a of the camera body 1, i.e., unless the film cartridge 50 is ejected from the cartridge chamber 1a. The arrangement of the embodiment, therefore, effectively prevents the cartridge chamber lid 41 from accidentally opening in a state of having the film outside the film cartridge 50 and from being inadvertently opened while the indication of the using state of the film cartridge 50 is still in process of being set.

What is claimed is:

1. A camera comprising:
    a) a cartridge accommodating chamber having a cartridge chamber lid arranged to be openable and closable, a film cartridge being loadable inside said cartridge accommodating chamber;
    b) a lens barrel unit arranged to be movable in an optical axis direction at least between a non-photo-taking position and a photo-taking position;
    c) lock means arranged to shift between an unlocking position where said lock means makes said cartridge chamber lid openable and a locking position where said lock means makes said cartridge chamber lid not openable, in response to a change of position of said lens barrel unit in the optical axis direction; and
    d) unlocking means for causing said lock means to shift to said unlocking position in association with an action of ejecting the film cartridge from said cartridge accommodating chamber.

2. A camera according to claim 1, wherein said unlocking means includes detecting means for detecting that the film cartridge has been loaded in said cartridge accommodating chamber, and a release member arranged to release said lock means in association with said detecting means.

3. A camera according to claim 2, wherein said detecting means includes an abutting part arranged to abut on a part of the film cartridge, and urging means for urging said abutting part inside said cartridge accommodating chamber.

4. A camera according to claim 3, wherein said detecting means is capable of causing the film cartridge loaded in said cartridge accommodating chamber to protrude outside said cartridge accommodating chamber by a predetermined amount.

5. A camera comprising:
   a) a cartridge accommodating chamber having a cartridge chamber lid arranged to be openable and closable, a film cartridge being loadable inside said cartridge accommodating chamber;
   b) a lens barrel unit arranged to be movable in an optical axis direction at least between a non-photo-taking position and a photo-taking position;
   c) lock means arranged to shift between an unlocking position where said lock means makes said cartridge chamber lid openable and a locking position where said lock means makes said cartridge chamber lid not openable, in response to a change of position of said lens barrel unit in the optical axis direction; and
   d) unlocking means for causing said lock means to shift to said unlocking position irrespective of the position of said lens barrel unit when the film cartridge is not loaded in said cartridge accommodating chamber.

6. A camera according to claim 5, wherein said unlocking means includes detecting means for detecting that the film cartridge has been loaded in said cartridge accommodating chamber, and a release member arranged to release said lock means in association with said detecting means.

7. A camera according to claim 6, wherein said detecting means includes an abutting part arranged to abut on a part of the film cartridge, and urging means for urging said abutting part inside said cartridge accommodating chamber.

8. A camera according to claim 7, wherein said detecting means is capable of causing the film cartridge loaded in said cartridge accommodating chamber to protrude outside said cartridge accommodating chamber by a predetermined amount.

* * * * *